May 24, 1932. H. W. WILSON 1,859,688
FENCE POST
Filed Jan. 22, 1931
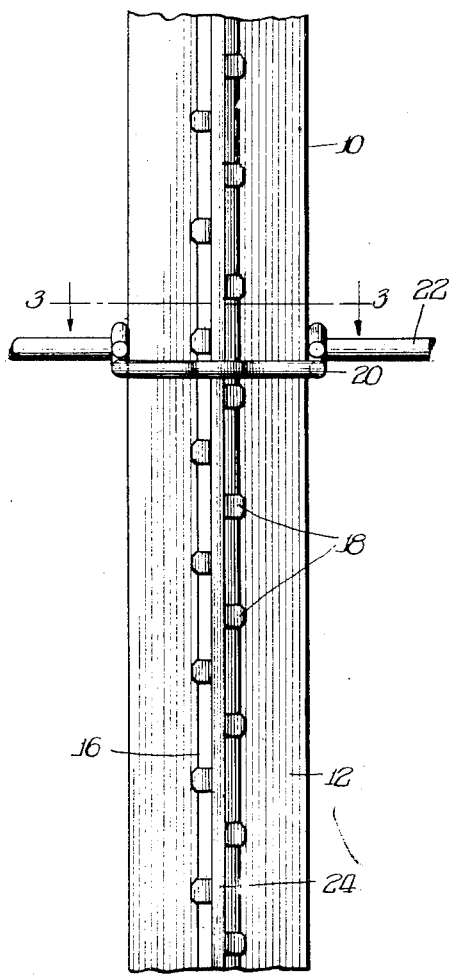
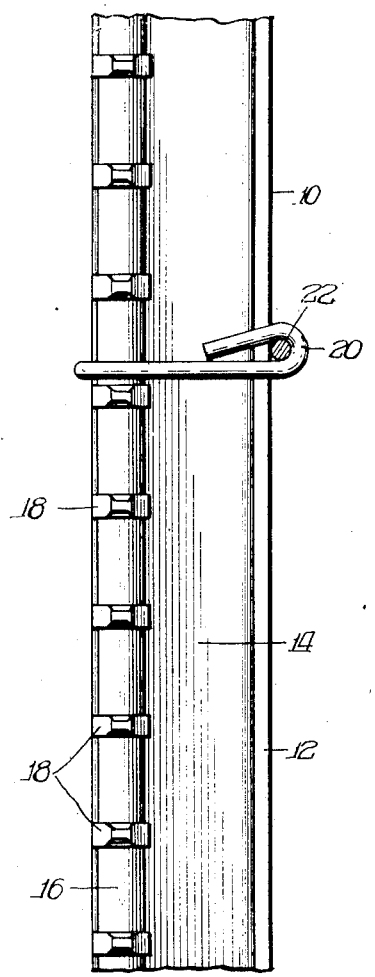
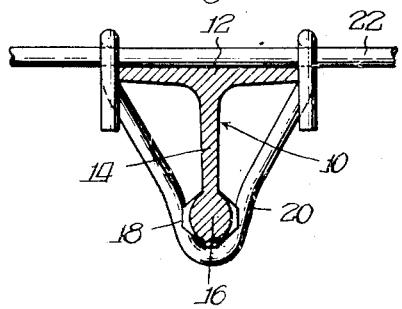
Inventor:
Henry W. Wilson,
By Munn & Parker
Attys Patented May 24, 1932

1,859,688

UNITED STATES PATENT OFFICE

HENRY W. WILSON, OF DULUTH, MINNESOTA

FENCE POST

Application filed January 22, 1931. Serial No. 510,515.

This invention relates to fence posts and the like and is disclosed herein as embodied in a novel type of post made of a rolled section. The various features and advantages of the invention will be brought out from a reading of the following specification and a study of the appended drawings, in which Figure 1 is a view of the rear of the post.

Figure 2 is a view of the side of the post shown in Figure 1.

Figure 3 is a vertical section taken along the line 3—3 of Figure 1.

As shown in the drawings, the reference numeral 10 indicates generally a rolled metal fence post that is T-shaped in cross section and comprises a head or face 12 and a stem 14. As disclosed, the stem is provided with a bulb 16 that is oval in cross section and is provided along its opposite sides with a series of elongated projections 18 having their major axes extending transversely of the lengthwise dimension of the bulb. These projections are in staggered relationship with regard to those on the opposite side of the bulbous portion and accordingly serve to engage and maintain in a proper vertical position wire fence post clips 20 which support horizontal fence wires 22. As disclosed in Figure 1, a rib 24 extends lengthwise of the rear of the bulb but it should be explained that this rib will normally result from rolling the post and does not particularly comprise a feature of the invention.

Having thus described the invention, what I claim as new and desire to secure by Letters Patent of the United States is:

1. A rolled section suitable for fence posts and the like, said section being approximately T-shaped in cross section, the stem of the T being formed with a bulb having a curved cross sectional boundary, and the bulb having projections on its opposite sides.

2. A rolled section suitable for fence posts and the like, said section being approximately T-shaped in cross section, the stem of the T being formed with a bulb having a curved cross sectional boundary, and the bulb having projections on its opposite sides, said projections on either side being separated from one another by a distance greater than the length of the projections.

3. A rolled section suitable for fence posts and the like, said section being approximately T-shaped in cross section, the stem of the T being formed with a bulb, and the bulb having elongated projections on its opposite sides, the major axes of the projections extending transversely of the longitudinal axis of the post.

4. A rolled section suitable for fence posts and the like, said section being approximately T-shaped in cross section, a bulb formed on the stem of the T, and spaced elongated projections formed on the opposite sides of the bulb, the projections on one side being staggered with respect to those on the other side.

Signed at Duluth, Minnesota.

HENRY W. WILSON.